United States Patent
Vaidya et al.

(10) Patent No.: US 10,769,233 B2
(45) Date of Patent: Sep. 8, 2020

(54) SYSTEMS AND METHODS FOR COMMUNICATION ACROSS MULTIPLE BROWSER PAGES FOR AN APPLICATION

(71) Applicant: Open Text Corporation, Waterloo (CA)

(72) Inventors: Samir Yasin Vaidya, Bangalore (IN); Swati Bhatia, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

(21) Appl. No.: 16/000,676

(22) Filed: Jun. 5, 2018

(65) Prior Publication Data

US 2018/0322216 A1 Nov. 8, 2018

Related U.S. Application Data

(60) Provisional application No. 62/518,655, filed on Jun. 13, 2017.

(51) Int. Cl.
*G06F 16/957* (2019.01)
*G06F 3/0483* (2013.01)
(Continued)

(52) U.S. Cl.
CPC ........ *G06F 16/9577* (2019.01); *G06F 3/0482* (2013.01); *G06F 3/0483* (2013.01);
(Continued)

(58) Field of Classification Search
CPC ...... G06F 16/9577; G06F 9/451; G06F 9/542; G06F 3/0482; G06F 3/0483; G06F 8/34; G06F 8/38; G06F 8/65
(Continued)

(56) References Cited

U.S. PATENT DOCUMENTS

| 7,502,853 B2 * | 3/2009 | Allamaraju | G06Q 30/02 |
| | | | 705/51 |
| 8,626,865 B1 * | 1/2014 | Phillips | G06F 16/9574 |
| | | | 709/213 |

(Continued)

OTHER PUBLICATIONS

Enterprise Application (EA); Jan. 23, 2017; Techopedia.com; pp. 1-2.*

(Continued)

*Primary Examiner* — Andrew R Dyer
(74) *Attorney, Agent, or Firm* — Sprinkle IP Law Group (57) ABSTRACT

A system for composing browser-based applications is enhanced with cross-tab communication capability. At design time, responsive to a configuration instruction from a user, the system configures a user interface (UI) event for a browser-based application such that the UI event is publishable across all open browser tabs at application runtime. Responsive to a publication instruction from the user, the system configures a first application page to generate the UI event at application runtime in response to a trigger and to publish the UI event to browser local storage. Responsive to a subscription instruction from the user, the system configures a second application page to periodically poll the browser local storage for the user interface event at application runtime and, in response to the UI event published by the first application page to the browser local storage, process the UI event and automatically immediately update the second application page.

20 Claims, 9 Drawing Sheets

(51) Int. Cl.
*G06F 8/38* (2018.01)
*G06F 3/0482* (2013.01)
*G06F 8/65* (2018.01)
*G06F 9/451* (2018.01)
*G06F 8/34* (2018.01)
*G06F 9/54* (2006.01)

(52) U.S. Cl.
CPC ............... *G06F 8/34* (2013.01); *G06F 8/38* (2013.01); *G06F 8/65* (2013.01); *G06F 9/451* (2018.02); *G06F 9/542* (2013.01)

(58) Field of Classification Search
USPC .......................................................... 715/273
See application file for complete search history.

(56) References Cited

U.S. PATENT DOCUMENTS

| | | | | |
|---|---|---|---|---|
| 8,950,005 | B1* | 2/2015 | Torney | G06F 21/629 713/193 |
| 2006/0248467 | A1* | 11/2006 | Elvanoglu | G06F 9/4493 715/744 |
| 2007/0299857 | A1* | 12/2007 | Gwozdz | G06F 16/957 |
| 2007/0300064 | A1* | 12/2007 | Isaacs | G06F 16/957 713/168 |
| 2009/0006981 | A1* | 1/2009 | Pagan | G06F 3/0481 715/752 |
| 2009/0187918 | A1* | 7/2009 | Chen | H04L 63/0435 719/313 |
| 2010/0199185 | A1* | 8/2010 | Greenberg | G06F 16/957 715/733 |
| 2010/0287146 | A1* | 11/2010 | Skelton | G06Q 10/06 707/705 |
| 2011/0265027 | A1* | 10/2011 | Lipstein | G06F 3/0483 715/777 |
| 2011/0276899 | A1* | 11/2011 | Li | G06Q 10/107 715/752 |
| 2011/0282938 | A1* | 11/2011 | Kim | G06F 9/54 709/203 |
| 2013/0212557 | A1* | 8/2013 | Edmunds | G06F 8/75 717/109 |
| 2015/0121194 | A1* | 4/2015 | Patten | G06F 3/0483 715/234 |
| 2015/0135076 | A1* | 5/2015 | Vuskovic | H04N 21/4782 715/719 |
| 2016/0328485 | A1* | 11/2016 | Dodonov | G06F 16/9574 |
| 2018/0007059 | A1* | 1/2018 | Innes | G06F 21/33 |
| 2018/0351936 | A1* | 12/2018 | Battacharya | H04L 63/083 |
| 2019/0197785 | A1* | 6/2019 | Tate-Gans | G06T 19/006 |

OTHER PUBLICATIONS

"EMC Documentum xCP Solution Development Platform", EMC Corporation, Data Sheet H4699.3, 2013, 4 pgs.

* cited by examiner

| Borrower Name | Amount | Interest Rate | Issue Date | Maturity Date |
|---|---|---|---|---|
| Borrower One | 100,000 | 3.50 | 05/01/17 12:00 am | 05/31/22 12:00 am |
| Borrower Two | 200,000 | 4.50 | 01/01/15 12:00 am | 02/28/22 12:00 am |
| Borrower Three | 300,000 | 5.50 | 08/01/11 12:00 am | 08/31/19 12:00 am ~660 |
| Borrower Four | 400,000 | 6.50 | 01/01/11 12:00 am | 03/31/19 12:00 am |
| Borrower Five | 500,000 | 7.50 | 05/01/17 12:00 am | 05/31/27 12:00 am |

617

Page size 10

FIG. 6A

| Loan Details |
|---|
| .../loan_details |
| Create Loan   List of Loans   Menu Item 3 |
| Amount: 300,000 |
| Borrower Name: Borrower Three |
| Interest Rate: 5.50 |
| Issue Date: 08/01/11 12:00 am |
| Maturity Date: 08/31/19 12:00 am |
| Status: pending |
| [Approve] — 608 |

Loan List (600)

| Borrower Name | Amount | Interest Rate | Issue Date | Maturity |
|---|---|---|---|---|
| Borrower One | 100,000 | 3.50 | 05/01/17 12:00 am | 05/31/22 |
| Borrower Two | 200,000 | 4.50 | 01/01/15 12:00 am | 02/28/22 |
| Borrower Three | 300,000 | 5.50 | 08/01/11 12:00 am | 08/31/19 |
| Borrower Four | 400,000 | 6.50 | 01/01/11 12:00 am | 03/31/19 |
| Borrower Five | 500,000 | 7.50 | 05/01/17 12:00 am | 05/31/27 |

617

Loan Details (640)

- Amount: 300,000
- Borrower Name: Borrower Three
- Interest Rate: 3.50
- Issue Date: 05/01/17 12:00 am
- Maturity Date: 05/31/22 12:00 am
- Status: pending
- [Approve] 608

Loan Details (650, 660)

- Amount: 300,000
- Borrower Name: Borrower Three
- Interest Rate: 5.50
- Issue Date: 08/01/11 12:00 am
- Maturity Date: 08/31/19 12:00 am
- Status: pending
- [Approve] 608

FIG. 7

SYSTEMS AND METHODS FOR COMMUNICATION ACROSS MULTIPLE BROWSER PAGES FOR AN APPLICATION

CROSS-REFERENCE TO RELATED APPLICATION(S)

This application claims a benefit of priority under 35 U.S.C. § 119(e) from U.S. Provisional Application No. 62/518,655, filed on Jun. 13, 2017, entitled "SYSTEMS AND METHODS FOR COMMUNICATION ACROSS MULTIPLE BROWSER PAGES FOR AN APPLICATION," which is fully incorporated by reference herein for all purposes.

TECHNICAL FIELD

This disclosure relates generally to application development. More particularly, this disclosure relates to application development and customization using an application development platform in an enterprise computing environment. Even more particularly, this disclosure relates to systems and methods for application development and customization using an application development platform in an enterprise computing environment that enables communication across multiple browser pages for an application.

BACKGROUND OF THE RELATED ART

In some application development platforms, customers can compose rich user interface (UI) applications without writing any code. Such application development platforms may bring together document and data capture, enterprise content management (ECM), business processes management (BPM), search and analytics, collaboration, customer communications, and records management to provide decision makers with immediate access to relevant and reliable information, streamline customer interactions for increased satisfaction and retention, automate business processes for reduced cycle times and decreased operating costs, and ensure completeness and accuracy of content for minimal risk of errors and non-compliance.

One example of such an application development platform is Documentum™ xCelerated Composition Platform (Documentum xCP), available from Open Text, headquartered in Waterloo, Ontario, Canada. Documentum xCP is a solution development platform for rapidly building and deploying content-centric applications that manage the entire lifecycle of enterprise information to help customers work smarter and faster. This solution development platform provides a streamlined, scalable technology for rapid, repeatable application development and deployment of cloud-ready solutions that can be adapted as needs evolve. Other application development platforms are also available.

In typical browser-based applications, communication is limited to within a single tab (or single page) of a browser (which, as skilled artisans can appreciate, refers to any computer program with a graphical user interface for displaying HyperText Markup Language (HTML) files and accessing information on the World Wide Web). That is, in typical browser-based applications, there is not a streamlined, efficient way that UI widgets on two different pages opened in two different tabs can communicate with each other. This often results in stale data on a page or pages opened in different tabs of a browser.

In some examples of a browser-based application, multiple browser tabs maybe opened with various data items populated in each. Because communication is limited to within a single tab (or single page) of the browser, other tabs (or pages) are not updated in response to a user's interactions with a particular tab (or page). Consequently, stale data is shown in other tabs (or pages) of the browser-based application. This data staleness can be problematic for several reasons.

For example, suppose a user has multiple tabs of a browser-based application open on their computer, but is logged out of the browser-based application in one tab. Since other open tabs are unaware that the user is logged out of the browser-based application, all the other open tabs will continue to show pages of the browser-based application. In another example, if a user changed their role in a particular tab, information (e.g., menus, windows, etc.) displayed in that particular tab may be changed accordingly. However, because other open tabs are unaware of the user's change to that particular tab, the other open tabs are not updated to reflect this change and will continue to show pages of the user's previous role and stale information.

In view of the foregoing, there is a need for innovations and improvements to application development platforms in enterprise computing environments.

SUMMARY OF THE DISCLOSURE

During the runtime (execution) of a browser-based application, it would often be desirable to communicate information between different browser pages, browser tabs, widgets, and other UI constructs. It would be desirable to communicate information between different browser tabs such that when there is some change in a data item due to some user action in one tab, the same could be reflected in all other open tabs if those data items are loaded there. Otherwise, stale data would be shown in other open tabs, as discussed above.

Accordingly, it is an object of the invention to provide innovations and improvements to application development and application development platforms in enterprise computing environments. In embodiments disclosed herein, this object can be realized by providing mechanisms to enabling cross-page or cross-tab communications between two or more open application pages/tabs.

In one example of an application development platform that overcomes problems in the art, UI composition can be performed utilizing various UI widgets. The communications between pages, widgets and other UI constructs can be done through widget events, UI events, and session parameters which in-turn can be defined and composed by the user (e.g., an application developer or designer) as required (described in detail below).

In some embodiments, UI events can be defined by an application developer to be published across open application pages. Open application pages can be configured to subscribe to UI events and take desired actions in response to published UI events. In some embodiments, UI event data can be written to a browser's local storage for the application domain, where it can be accessed by other open pages/tabs.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

The invention and the various features and advantageous details thereof are explained more fully with reference to the non-limiting embodiments that are illustrated in the accompanying drawings and detailed in the following description. These embodiments may be better understood with reference to the exemplary solution development platform mentioned above, although embodiments can be implemented using other development platforms as well.

As described above, during application runtime of a browser-based application, multiple browser pages/tabs may be open with various data items populated in each. As mentioned above, it would be desirable to communicate information between different browser tabs in case there are some changes in a data item due to some user action in one tab, so the same changes could be reflected in all other tabs if those data items are loaded there.

Generally, this disclosure teaches techniques for developing browser-based applications that enable cross-tab communications between pages of the application opened in other browser tabs or windows. In some embodiments, an application development platform enables an application developer to define and configure "events" that are published by one widget or page and monitored or subscribed by other application pages. In one example, the events and associated data are stored in the browser local storage, which is implemented in most conventional web browsers. The application pages periodically poll the browser local storage to determine if event data has been updated. If event data has been updated, each respective page can either ignore the event, or update some widget value, as configured and defined by the application developer (described in detail below). As a result, information can be communicated across multiple browser pages for the browser-based application.

To overcome the limitations in the prior art (described above), embodiments of a cross-tab communication have been developed. In some embodiments, cross-tab communication is implemented using "UI event" features of the above-referenced solution development platform.

The above-referenced solution development platform brings together document and data capture, ECM, BPM, search and analytics, collaboration, customer communications, and records management to give decision makers immediate access to relevant and reliable information, streamline customer interactions for increased satisfaction and retention, automate business processes for reduced cycle times and decreased operating costs, and ensure completeness and accuracy of content for minimal risk of errors and non-compliance. The solution development platform includes xCP Designer—a unified solution-design tool (referred to herein as a "designer tool") that enables application designers to rapidly design new information-centric solutions that leverage business processes, information models, data sources including big data and user interfaces. The designer tool integrates process design, user-experience definition, dynamic report creation, information modeling, and comprehensive data services into a single, easy-to-use environment.

The designer tool provides a graphical, "drag-and-drop" design environment. Thus, using the designer tool, an application designer can compose an application instead of writing custom code. Using the designer tool can thus accelerate development and deployment of solutions by up to 50 percent. the designer tool contains a full library of prebuilt UI widgets, business-process activity templates, and data services.

In some embodiments, the designer tool is enhanced with a cross-tab communication functionality. At design time, a user of the designer tool (e.g., an application developer or application designer, referred to herein as a "designer") starts the designer tool which runs on the above-referenced solution development platform.

Using the designer tool, the designer can design the whole browser-based application, including the data model and the UI. The UI can be made up of several pages (e.g., screens, tabs, windows, etc., referred to herein as "application pages"). For example, for a recruitment application, there can be a page for interviews, a page for candidates, etc. Likewise, for a loan processing application, there can be a page for loan applications, a page for loan applicants, a page for loan in review for approval, a page for approved loans, etc. In designing the UI for the browser-based application, the designer can define a new UI event for the browser-based application with a scope as "Across Tabs," defines which application page publishes the UI event and when, and define which application page subscribes to the UI event and what action(s) to take, if any. Non-limiting examples are provided below in conjunction with the description of FIGS. 4A-4B and FIGS. 5A-5C.

When an end user accesses the browser-based application in a browser, the user can open multiple different application pages (browser tabs) in the browser. If the end user makes a change to one of the browser tabs, the change would be automatically immediately reflected in other browser tabs.

Traditionally, this is a very complicated and cumbersome process. For example, the system would need to keep track of all the browser windows that are open (e.g., using code written in JavaScript) and update them individually when a change to one of them is made. For example, using a JavaScript window.open function, the system can keep track of all parent and child windows, and whenever a UI event is published, it could be propagated up and down the hierarchy. One challenge of this approach is that if a new browser tab is opened manually by a user by directly pasting another page URL in the navigation bar, then the linking between windows may be lost, and the event propagation may break down. Further, using code written in JavaScript to keep track of all the open browser windows can quickly become unmanageable due to the resources needed to keep up all the changes across all the browser windows.

To overcome these problems, embodiments disclosed herein advantageously leverages the concept of browser local storage (also known as the HTML5 local storage) and provides the ability for cross-tab communication to browser-based applications developed using a designer tool enhanced with a cross-tab communication functionality. Browser local storage is a component of the Web storage application programming interface. It is a method by which Web pages locally store named key/value pairs inside a client's Web browser. Similar to cookies, the locally saved data exists even when an end user closes a browser tab, surfs away from a current website, exits a browser tab, or closes a main browser. Browser local storage is a known storage feature implemented by all modern browsers including Internet Explorer (IE), Firefox, Chrome and Safari.

At design time of a browser-based application, the cross-tab communication is enabled, along with cross-tab communication configuration information for application pages (e.g., which application page publishes what UI event and when, and which application page subscribes to what UI event and what action(s) to take, if any). At runtime of the browser-based application, when something happens to a browser tab of the browser-based application, an event is published. The event data is updated inside the browser local storage.

That is, when an event occurs within an application page enabled with the cross-tab communication, the application page writes the event to the browser local storage. All the browser tabs (i.e., application pages that are opened in the browser by an end user on a user device) keep polling the browser local storage (e.g., every two seconds, every one second, etc.), continuously checking the browser local storage. When a particular event occurs (and is published to the browser local storage), the browser tabs that listen (subscribe) to the particular event update themselves.

The designer tool already provides the ability for an application page to monitor UI events internally (i.e., within the same browser tab). For instance, an application page includes a text box or feature with an input field, when a change is made to the text box or feature, the application page updates itself to reflect the change. While this kind of eventing was allowed, the change cannot propagate across browser tabs. The cross-tab communication can extend the eventing capability of the designer tool so that events can be published across browser tabs (application pages).

Figure 1:
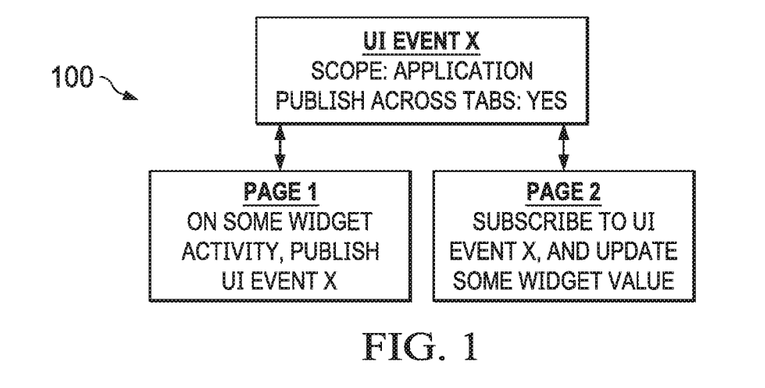
FIG. 1 depicts a block diagram illustrating a cross-tab communication mechanism at design time of a browser-based application according to some embodiments.

FIG. 1 is a block diagram illustrating cross-tab communication mechanism 100 among pages of a browser-based application. FIG. 1 shows cross-tab communication mechanism 100 from the perspective of composing/developing the browser-based application at design time. In the example shown in FIG. 1, a first page ("Page 1") is configured to publish a UI event ("UI Event X") on some widget activity. A second page ("Page 2") is configured to subscribe to the UI event published by the first page ("UI Event X) and, when the UI event occurs, to update some widget value. That is, at design time, a designer defines a UI event, adds a function to the first page (publication of a UI event), and also adds a function to the second page (subscription to the UI event) so that, at runtime, the first page publishes the UI event to the browser local storage and the second page polls the browser local storage for the UI event. In this example, the UI event is configured with a scope (e.g., "Application") and whether to publish across tabs (e.g., "Yes"). This means that, at runtime of the browser-based application, the UI event will be published across all open browser tabs of the browser-based application.

Figure 2:
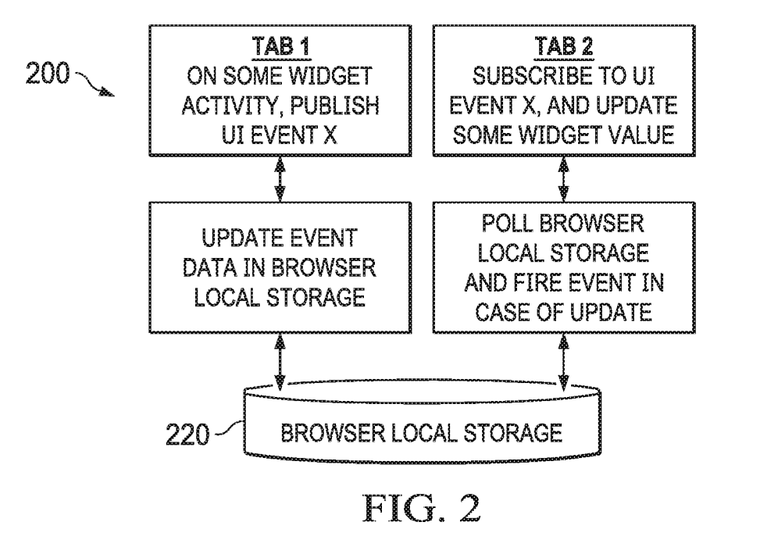
FIG. 2 depicts a block diagram illustrating a cross-tab communication mechanism at runtime of a browser-based application according to some embodiments.

FIG. 2 is a block diagram illustrating cross-tab communication mechanism 200 at runtime of the browser-based application. The browser-based application runs within a runtime environment provided by a browser. With the cross-tab communication functionality enabled at design time, when an end user interacts with a browser page of the browser-based application at application runtime, the user interaction can cause publication of a UI event to the browser local storage. Other application pages that are opened in the browser may subscribe to this UI event and thus continuously poll the browser local storage for the UI event. When the event is published to the browser local storage at runtime, the subscribing application pages can know that the UI event has occurred and operate to take appropriate action. An appropriate action may be, for example, refreshing the widget or model or page. An appropriate action could also be to ignore the event, in examples where the action taken by the end user does not affect the respective application page.

In the example of FIG. 2, a browser tab ("Tab 1") corresponding to the first page of the browser-based application of FIG. 1 publishes a UI event to browser local storage 220 upon some widget activity. The event data (resulting from the UI event) is updated in browser local storage 220, which is accessible by all other application pages. Each event is temporarily stored in browser local storage 220. In some embodiments, the information stored can include the event name (e.g., "UI Event X") and event payload. Along with this, a unique identifier of the source tab (e.g., "Tab 1") which generated the respective event is appended to the payload of the event. This is done so that the browser tab that publishes the UI event does not consume the UI event. A unique identifier may also be attached to each event to distinguish between two similar events fired in sequence. The event information may also include other information, as desired.

In the example of FIG. 2, a browser tab ("Tab 2") corresponding to the second page of the browser-based application of FIG. 1 is configured to subscribe to the UI event published by the first page and to update some widget value upon the occurrence of the UI event. The second page periodically (e.g., every few seconds, as desired) polls browser local storage 220 for the particular UI event and fires the UI event in case of an event update.

Figure 3:
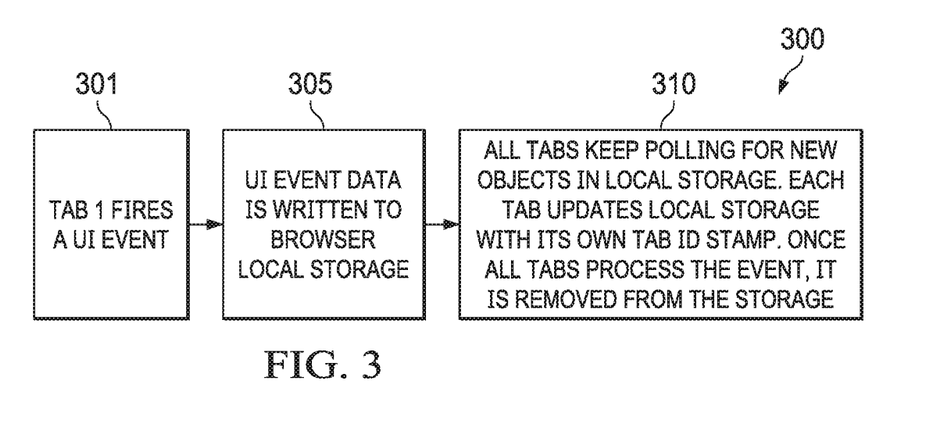
FIG. 3 is a flow diagram illustrating an example of an UI event being processed by a browser-based application at runtime according to some embodiments.

FIG. 3 is a flow diagram illustrating an example of a UI event being processed by a browser-based application. In FIG. 3, process 300 may begin when the first page of the browser-based application of FIG. 1 fires a UI event (301). The UI event can be any desired event, as defined by the designer. For example, the UI event may relate to a task being competed. In the example data structure shown below, the UI event is given the name, "event_x".

```
{
  ...
  "name": "event_x",
  "payload":
  {
    "key1": "value1",
    "keyN": "valueN"
  }
}
```

In this example, the UI event "event_x" has a payload with a desired number of data items. For instance, "key1" has a value of "value1" and "keyN" has a value of "valueN".

The above UI event data is written to the browser local storage (e.g., browser local storage 220 shown in FIG. 2), which it is accessible by other application pages (305). Following the above example for the UI event "event_x", the message stored in the browser local storage is given a unique identifier ("msg_id") having a value "unique_number". The UI event data stored the browser local storage in also includes an identifier of the source page/tab ("src_tab_id") having a value of "tab_unique_id". The UI Event data stored in the browser local storage also includes the event name and payload, as shown in the data structure below:

```
{
  "msg_id": <unique_number>,
  "src_tab_id": <tab_unique_id>,
  "name": "event_x",
  "payload":
  {
    "key1": "value1",
    "keyN": "valueN"
  }
}
```

All of the application pages (browser tabs) periodically poll the browser local storage—they read the same data structure exemplified above. When they find a UI event that they subscribe to, they append the browser local storage with its own browser tab identifier (ID) stamp. Once they read the data and do what they are required to do, they indicate that they have processed this UI event so the browser tab does not process the same event again. Once all the browser tabs have processed an UI event, the UI event is removed from the browser local storage by the last browser tab (310). As shown below, the data stored in the browser local storage can be updated by each browser tab by adding identifiers ("tab_1_id", "tab_n_id", etc.) to a "processed_by" field.

```
{
  "msg_id": <unique_number>,
  "src_tab_id": <tab_unique_id>,
  "name": "event_x",
  "payload":
  {
    "key1": "value1",
    "keyN": "valueN"
  }
  "processed_by":
  [
    "tab_1_id",
    "tab_n_id"
  ]
}
```

The last browser tab knows that it is the last to process the UI event by using a master list. As part of the infrastructure on which the designer tool is run, when a new browser tab is opened using the browser-based application at runtime, the browser tab is configured to write its browser tab ID to the master list (which is another storage area in the browser local storage) indicating that it has been opened. The master list keeps track of how many browser tabs are running within the browser. Every time when a browser tab polls the browser local storage, it checks the master list to see if it is the last browser tab that is doing this updating for the UI event of interest (which, in the example above, is "event_x"). If so, it will then remove the data structure associated with the UI event of interest.

At any given time, the browser local storage can have multiple data structures, each for a UI event published thereto. Each browser tab is operable to check each data structure in the browser local storage for whatever UI event that they are subscribed to. When a UI event is found, the browser tab appends its ID to the data structure and processes the UI event. The browser tab also checks the master list against the list of "processed_by" in the data structure. If the UI event has been processed by all the browser tabs that are open in the browser, it deletes the data structure from the browser local storage.

While the cross-tab communication mechanism described above may be applied to any desired type of application, below is one example of an implementation.

Figure 4A:
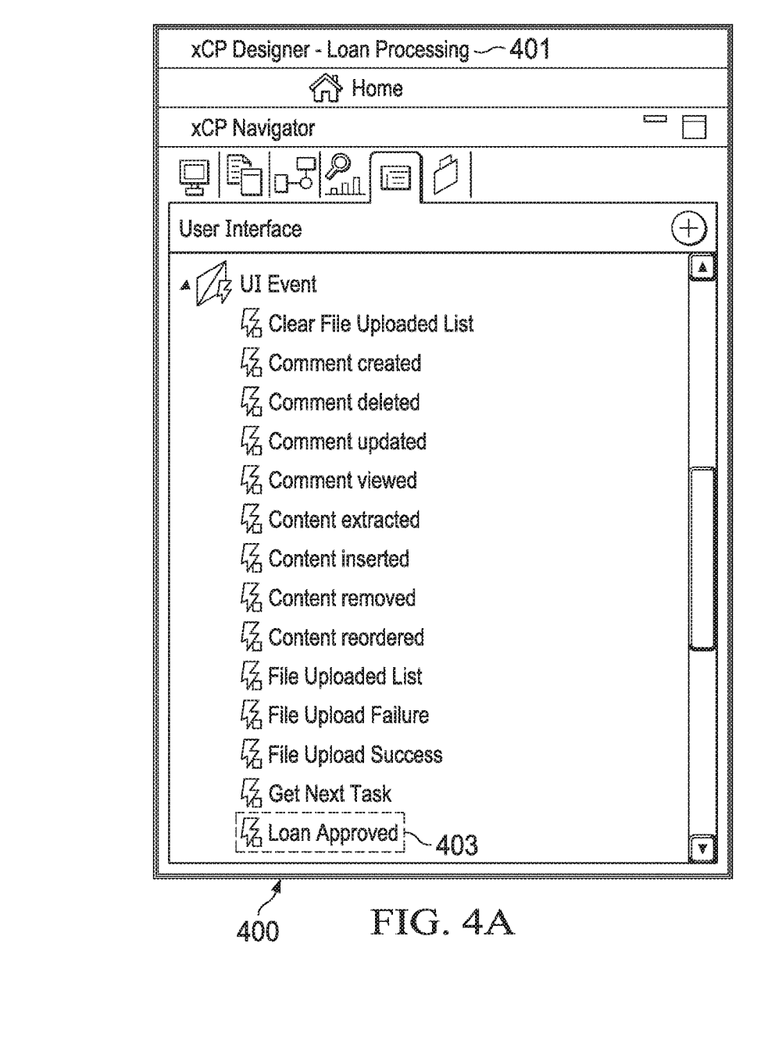
FIGS. 4A-4B depict diagrammatic representations of screenshots captured during design time of a browser-based application, showing examples of UI events according to some embodiments.
Figure 4B:
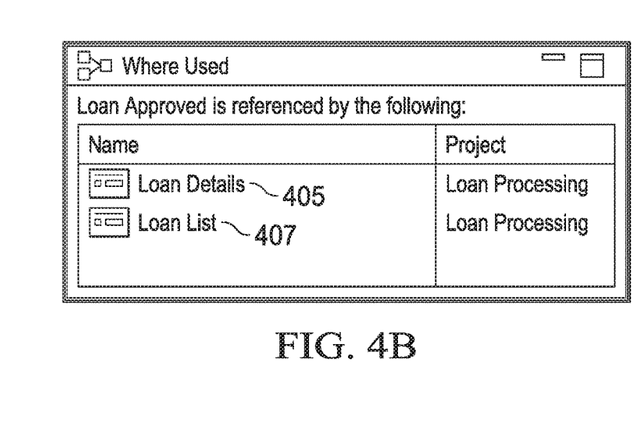

FIGS. 4A-4B depict diagrammatic representations of screenshots of UI 400 of a designer tool. FIG. 4A shows that UI event 403 is defined for a UI of browser-based application 401. FIG. 4B shows that browser-based application 401 has pages 405, 407. In this example, the designer is developing an application that will enable an end user to see a page listing pending (unapproved) loans (page 407), and a loan detail page for each of the loans (page 405). The designer tool in this example includes an xCP navigator panel on the left portion of the designer's screen. The navigator panel provide a plurality of menu items that can be used by a designer to configure various aspects of an application, such as application settings, object models, UI, processes, and data services. In this case, the designer configures a business object called "Loan", and specifies various attributes to the object, such as amount, borrower name, interest rate, issue date, maturity date, and status. The designer also configures a context menu for the object, including various properties, such as specifying that clicking this object invokes opening the Loan Details page in a new tab. Under the data services configuration, the designer configures a real-time query called "Pending Loan List" to enable an end user to display a list of pending loans. Here, the designer configures the real-time query dataset parameters, such as data relationships, output display parameters (e.g., output columns to be displayed to the end user), and predefined inputs such as the status of the loan ("pending", "approved", etc.). The designer tool allows the designer to configure various aspects of the UI. For example, the designer can configure the layout for the loan detail page to include a button that enables an end user to mark the status of each respective pending loan as "approved".

Figure 5A:
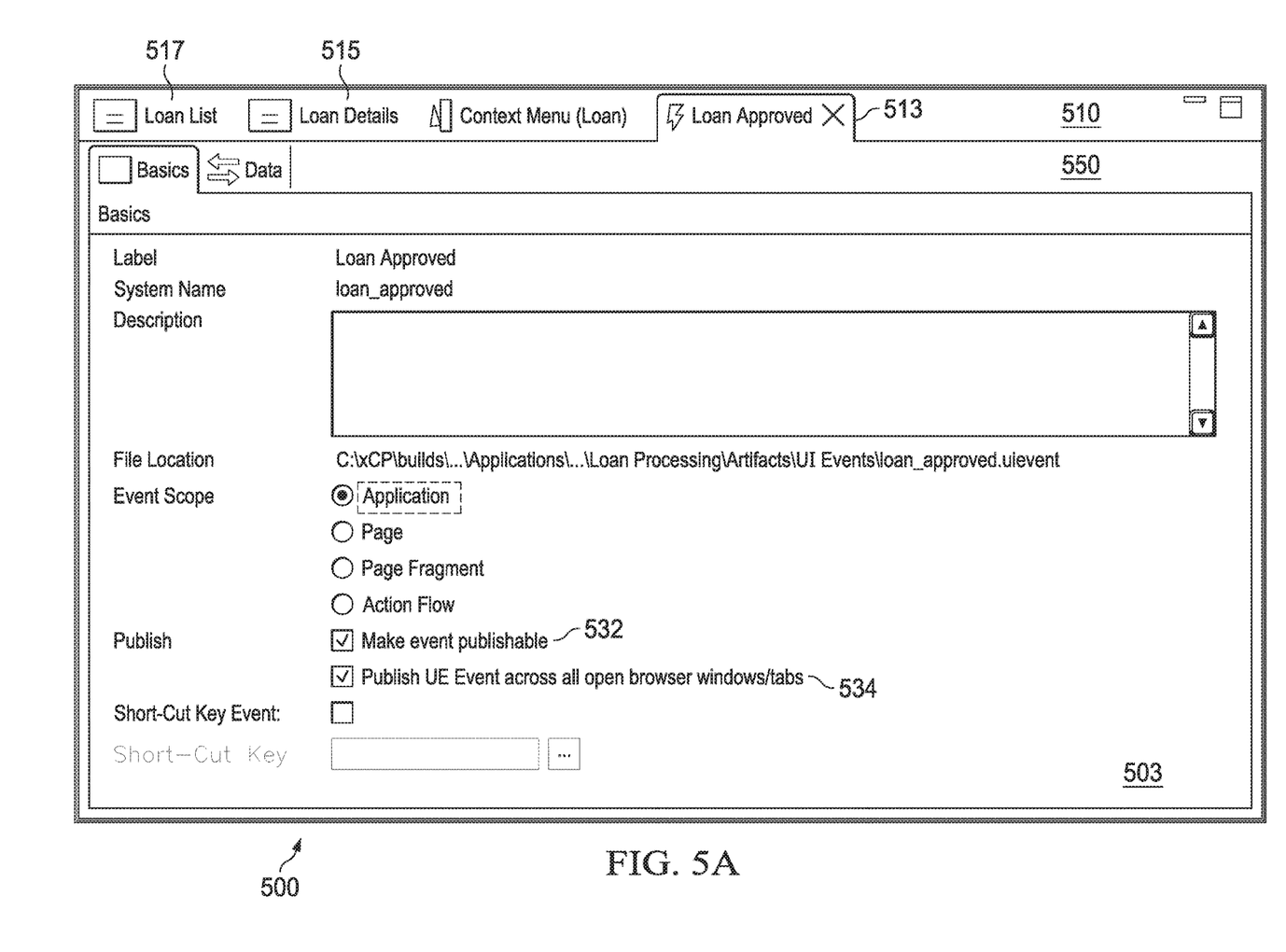
FIGS. 5A-5C depict diagrammatic representations of screenshots captured during design time of a browser-based application, exemplifying an application page publishing a UI event and another application page subscribing to the UI event according to some embodiments.
Figure 5B:
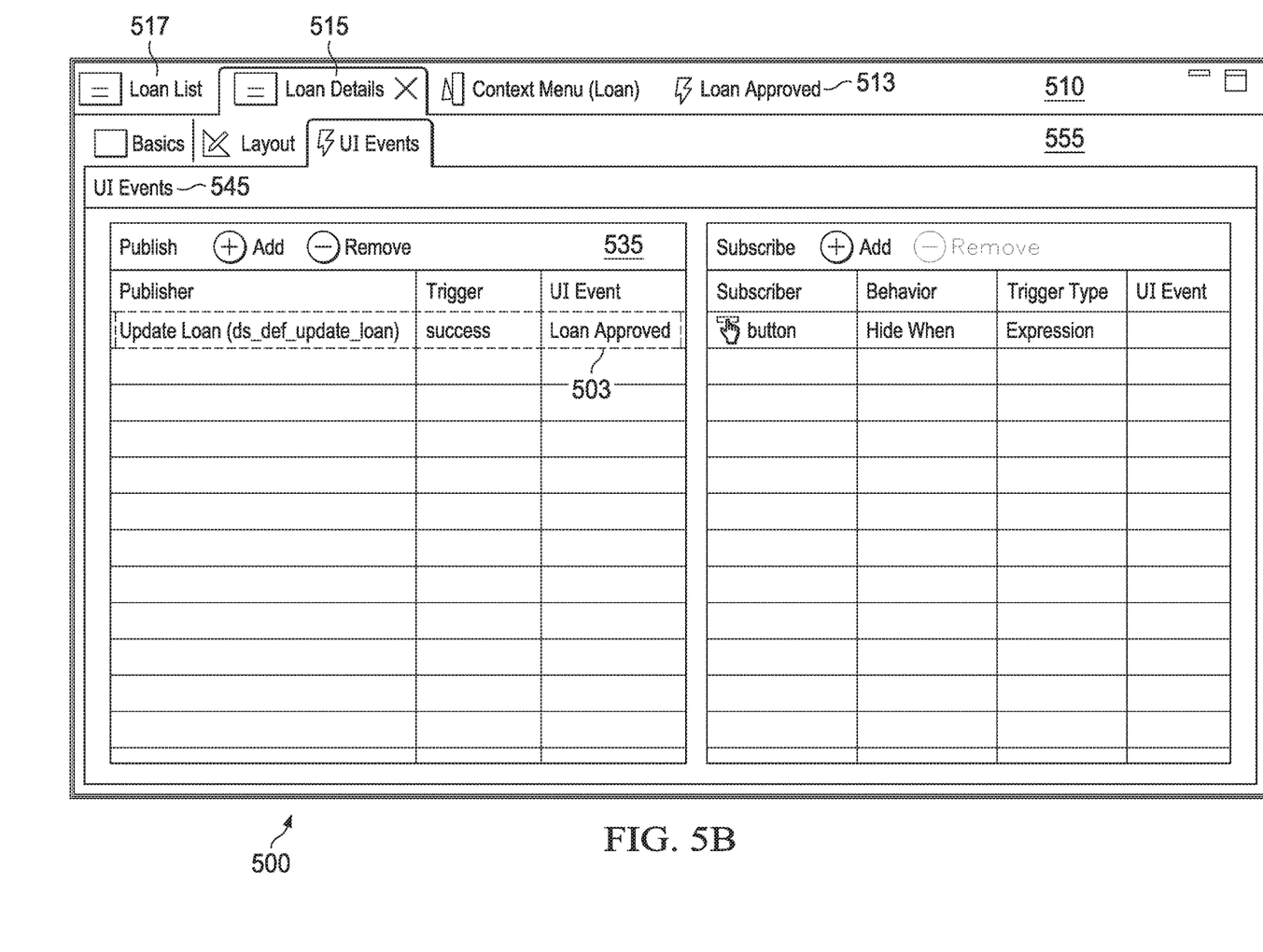
Figure 5C:
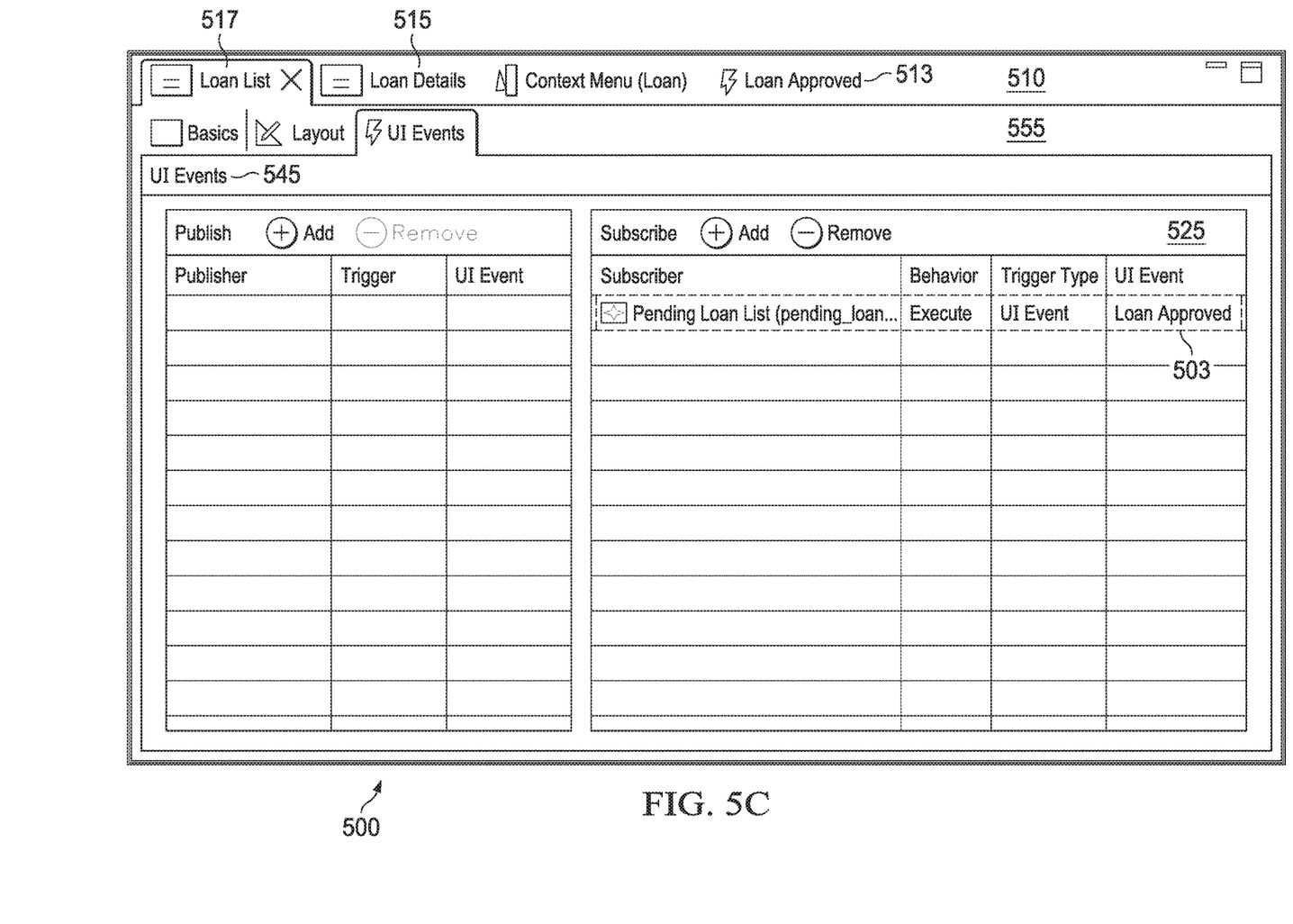

In the example above, the designer configures the "Loan Approved" UI event, which is triggered by the end user clicking the "Approve" button on a respective Loan Details page. FIGS. 5A-5C depict diagrammatic representations of screenshots of UI 500 of a designer tool. FIG. 5A shows menu 510 of the designer tool which includes configuration tab 517 for configuring the "Loan List" page described above (e.g., page 407), configuration tab 515 for configuring the "Loan Details" page described above (e.g., page 405), and configuration tab 513 for configuring the "Loan Approved" UI event described above (e.g., UI event 403). The designer can configure UI 503 through menu 550 of configuration tab 513. As discussed above, eventing within an application page is already possible by checking box 532 to make UI event 503 publishable. The designer tool is enhanced with box 534 which allows the designer to configure UI event 503 so that UI event 503 is publishable across all open browser windows/tabs.

FIG. 5B shows example configuration for the "Loan Details" page through configuration tab 515. UI events configuration settings 545 for the "Loan Details" page include publication settings 535. In this example, "Loan Details" page is configured to update data upon UI event 503 (which, in this example, is the "Loan Approved" UI event). FIG. 5C shows example configuration for the "Loan List" page through configuration tab 517. UI events configuration settings 545 for the "Loan List" page include subscription settings 525. In this example, the "Loan List" page is configured to subscribe to the UI event 503 (which, in this example, is the "Loan Approved" UI event), and to execute an update in response to the event.

Figure 6A:
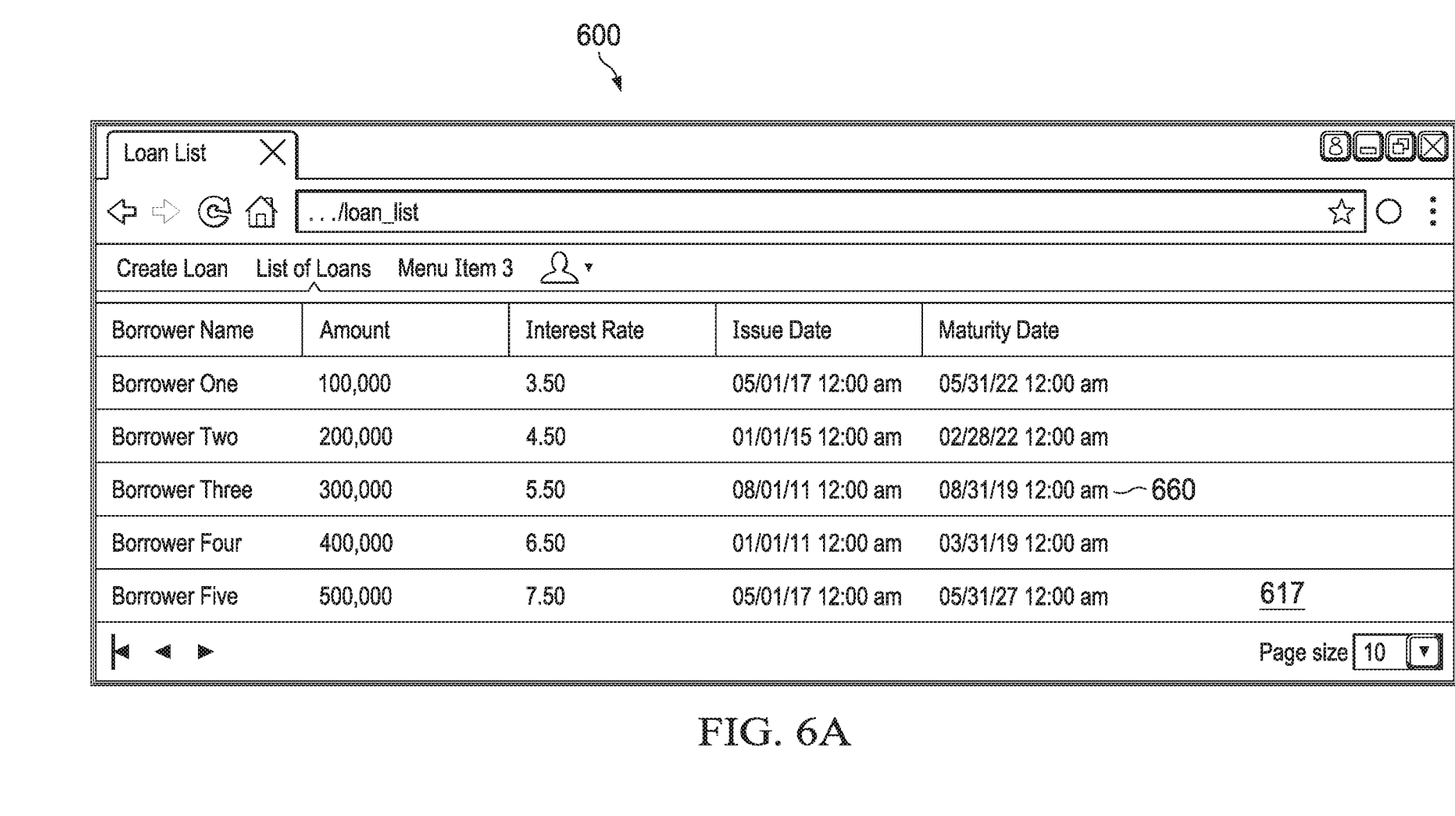
FIGS. 6A-6C depict diagrammatic representations of screenshots captured during runtime of the browser-based application developed and configured as shown in FIGS. 5A-5C according to some embodiments.
Figure 6B:
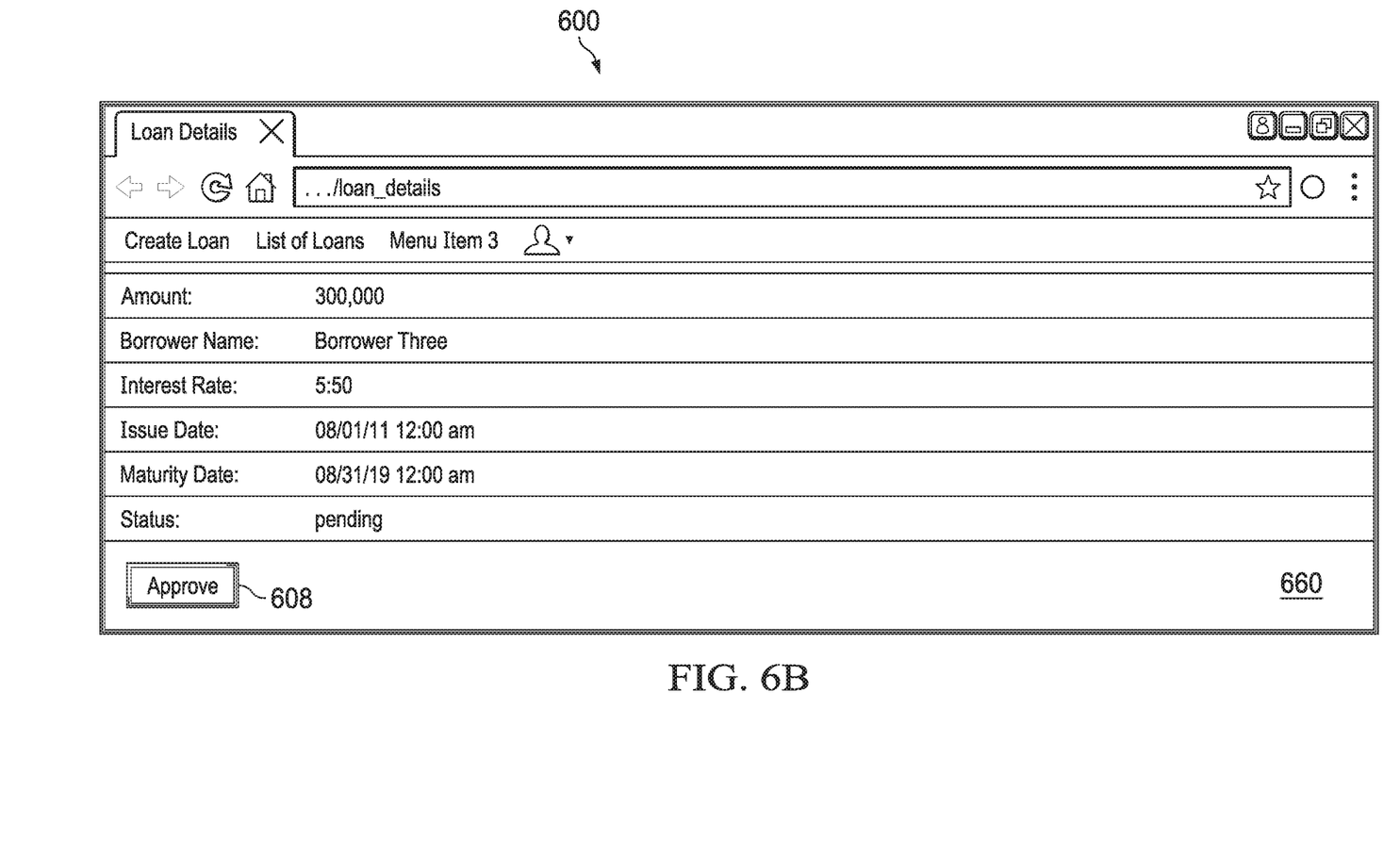
Figure 6C:
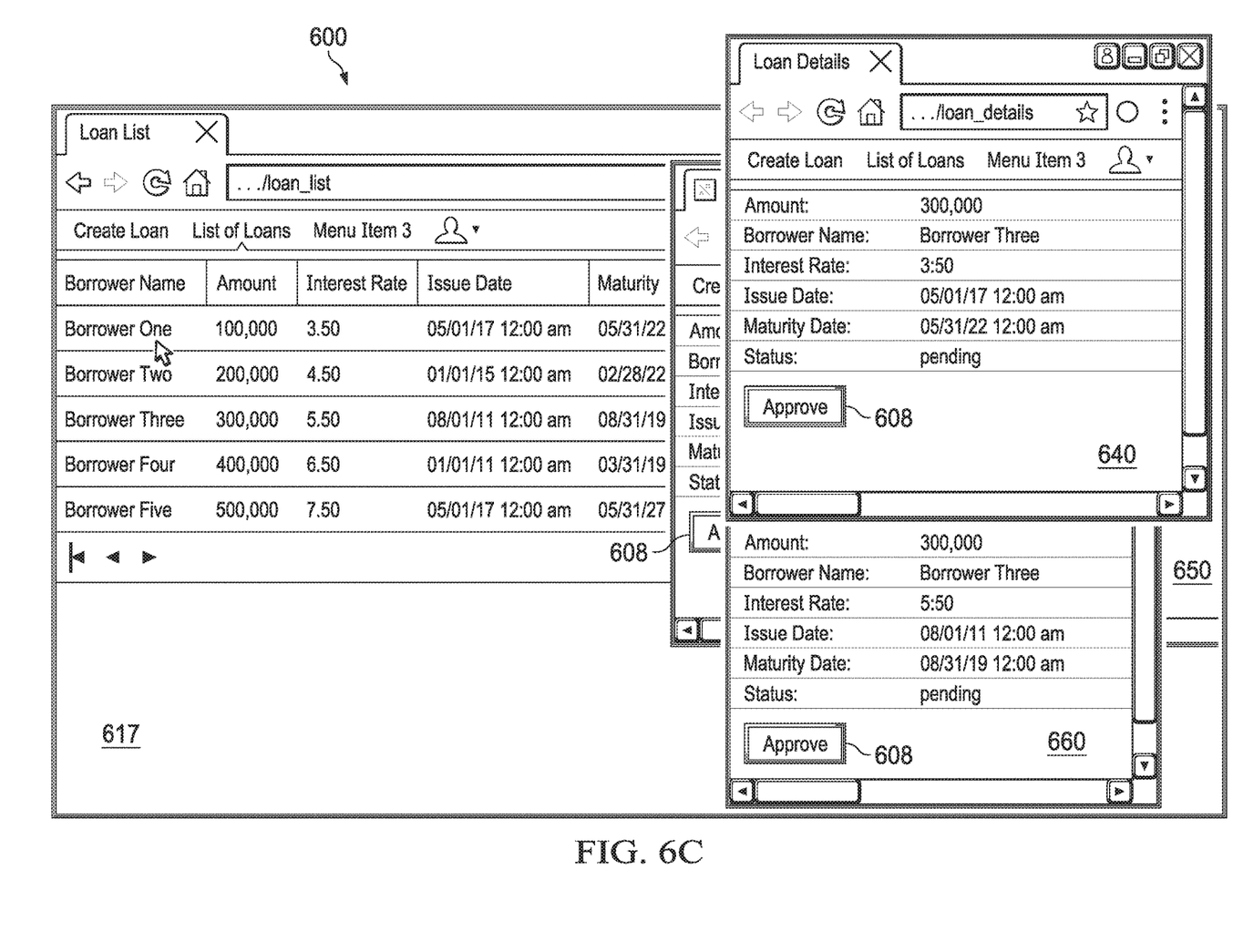

FIGS. 6A-6C depict diagrammatic representations of screenshots of UI 600 at runtime of the browser-based application developed and configured as shown in FIGS. 5A-5C according to some embodiments. FIG. 6A shows page 617 (which, in this example, is the "Loan List" page) of browser-based application running in a browser environment. In this example, the "Loan List" page shows a list of five pending loans. Responsive to an end user selecting an item (which represents a loan for "Borrower Three") from the list, page 660 (which, in this example, is the "Loan Details" page) is presented to the end user through UI 600. In this example, the "Loan Details" page shows details of the loan for Borrower Three and includes "Approve" button 608. As shown in FIG. 6C, the end user can open multiple pages in multiple browser tabs/windows—in this example, page 617 (the "Loan List" page) and pages 640, 650, 660 (different "Loan Details" pages for different borrowers). Each time the end user opens an application page, the corresponding browser window/tab adds its own ID to the master list in the browser local storage. In this example, four application pages 617, 640, 650, 660 are open.

Suppose the end user clicks button 608 on page 640 (Borrower One's "Loan Details" page). After the end user clicks "Yes" to confirm the approval, the associated UI event is triggered. As discussed above, page 640 publishes the UI event/writes UI event data (e.g., message identifier, source tab identifier, event name, payload) to the browser local storage. In this example, page 650 polls the browser local storage and finds that the UI event "Loan Approved" is published to the browser local storage. Since page 650 was configured at design time to subscribe to this particular UI, and it's not the last page to process this UI event, it processes the UI event and appends its tab ID to the data structure for the UI event "Loan Approved" in the browser local storage. If it is the first page to process this UI event, it adds the following to the data structure.

```
"processed_by":
[
    "tab_650",
]
```

Likewise, page 617 polls the browser local storage and finds that the UI event "Loan Approved" is published to the browser local storage. Since page 617 was configured at design time to subscribe to this particular UI, and it's not the last page to process this UI event, it processes the UI event and it appends its tab ID to the data structure for the UI event "Loan Approved" in the browser local storage. In this case, it adds "tab_617" to the data structure, as shown below.

```
"processed_by":
[
    "tab_650",
    "tab_617"
]
```

Page 660 also polls the browser local storage and finds that the UI event "Loan Approved" is published to the browser local storage. However, according to the master list, page 660 is the last one to process this UI event. Thus, page 660 processes the UI event and deletes the data structure for the UI event from the browser local storage.

By processing the same UI event published to the browser local storage in accordance with the UI configuration defined at design time (e.g., through cross-tab function 534 provided by the designer tool), all open browser windows/tabs are automatically immediately updated/refreshed in the runtime environment (proactively by the corresponding application pages themselves). The end user does not have to manually update or refresh any browser windows/tabs.

Figure 7:
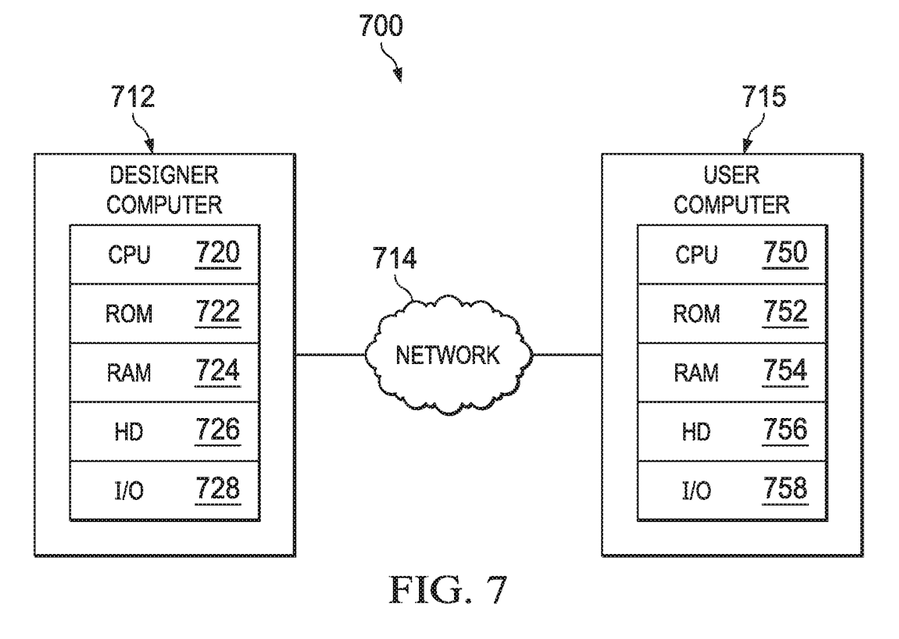
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example illustrated, network computing environment 700 includes network 714 that can be bi-directionally coupled to designer computer 712 and user computer 715. Network 714 may represent a combination of wired and wireless networks that network computing environment 700 may utilize for various types of network communications known to those skilled in the art.

For the purpose of illustration, a single system is shown for each of computer 712 and computer 715. However, with each of computer 712 and computer 715, a plurality of computers (not shown) may be interconnected to each other over network 714. For example, a plurality of computers 712 and a plurality of computers 715 may be coupled to network 714. Computers 712 may include data processing systems for application developers whose jobs may require them to design, build, and/or customize applications for user computer 715.

Computer 712 can include central processing unit ("CPU") 720, read-only memory ("ROM") 722, random access memory ("RAM") 724, hard drive ("HD") or storage memory 726, and input/output device(s) ("I/O") 728. I/O 728 can include a keyboard, monitor, printer, electronic pointing device (e.g., mouse, trackball, stylus, etc.), or the like. Computer 712 can include a desktop computer, a laptop computer, a personal digital assistant, a cellular phone, or nearly any device capable of communicating over a network. Computer 715 may be similar to computer 712 and can comprise CPU 750, ROM 752, RAM 754, HD 756, and I/O 758. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712 and 715 is an example of a data processing system. ROM 722 and 752; RAM 724 and 754; and HD 726 and 756; can include media that can be read by CPU 720 or 750. Therefore, these types of memories include non-transitory computer-readable storage media. These memories may be internal or external to computers 712 or 715.

Portions of the methods described herein may be implemented in suitable software code that may reside within ROM 722 or 752; RAM 724 or 754; or HD 726 or 756. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be implemented using any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A method of developing browser-based enterprise applications with a cross-tab communication mechanism, the method comprising:
   providing, by a computer having a processor and a non-transitory computer-readable medium, an application designer tool for composing browser-based enterprise applications in an enterprise computing environment, the application designer tool having a plurality of components including a user interface composition function;
   receiving, by the computer through the user interface composition function of the application designer tool, a cross-tab communication instruction from a user at design time of a browser-based enterprise application in the enterprise computing environment;
   responsive to the cross-tab communication instruction from the user through the user interface composition function, configuring, by the computer at design time of the browser-based enterprise application in the enterprise computing environment, a user interface event for the browser-based enterprise application, wherein the user interface event is publishable across all open browser tabs at runtime of the browser-based enterprise application;
   responsive to a publication instruction from the user through the user interface composition function, configuring, by the computer at design time of the browser-based enterprise application in the enterprise computing environment, a first application page of the browser-based enterprise application, wherein the first application page of the browser-based enterprise application thus configured is operable to generate the user interface event at runtime of the browser-based enterprise application in response to a trigger and to publish the user interface event thus generated to a browser local storage; and responsive to a subscription instruction from the user through the user interface composition function, configuring, by the computer at design time of the browser-based enterprise application in the enterprise computing environment, a second application page of the browser-based enterprise application, wherein the second application page of the browser-based enterprise application thus configured at design time of the browser-based enterprise application is operable to periodically poll the browser local storage for the user interface event at runtime of the browser-based enterprise application and, in response to the user interface event published by the first application page to the browser local storage at runtime of the browser-based enterprise application, process the user interface event and update the second application page at runtime of the browser-based enterprise application.

2. The method according to claim 1, further comprising:
configuring, by the computer, the first application page of the browser-based enterprise application to publish the user interface event to the browser local storage by creating a data structure containing event data for the user interface event and storing the data structure in the browser local storage.

3. The method according to claim 2, wherein the data structure includes an event name and a payload for the user interface event.

4. The method according to claim 1, further comprising:
responsive to subscription instructions from the user to configure a plurality of application pages of the browser-based enterprise application to subscribe to the user interface event, configuring, by the computer, the plurality of application pages to each periodically poll the browser local storage for the user interface event at runtime of the browser-based enterprise application and, in response to the user interface event published by the first application page to the browser local storage at runtime of the browser-based enterprise application, to each process the user interface event and update the each application page.

5. The method according to claim 1, further comprising:
configuring, by the computer, the plurality of application pages to, in response to the user interface event published by the first application page to the browser local storage at runtime of the browser-based enterprise application, each append a tab identifier to a data structure for the user interface event in the browser local storage.

6. The method according to claim 5, further comprising:
configuring, by the computer, the plurality of application pages to each check a master list in the browser local storage, determine whether the each application page is last to process the user interface event, and, responsive to a determination of being last to process the user interface event, remove the user interface event from the browser local storage.

7. The method according to claim 1, wherein the user interface composition function of the application designer tool includes a cross-tab communication mechanism and wherein the cross-tab communication instruction is received from the user by the user selecting the cross-tab communication mechanism in configuring the user interface event for the browser-based enterprise application at design time.

8. A computer program product for developing browser-based enterprise applications with a cross-tab communication mechanism, the computer program product comprising a non-transitory computer-readable medium storing instructions translatable by a processor to perform:

providing an application designer tool for composing browser-based enterprise applications in an enterprise computing environment, the application designer tool having a plurality of components including a user interface composition function;

receiving, through the user interface composition function of the application designer tool, a cross-tab communication instruction from a user at design time of a browser-based enterprise application in the enterprise computing environment;

responsive to the cross-tab communication instruction from the user through the user interface composition function, configuring, at design time of the browser-based enterprise application in the enterprise computing environment, a user interface event for the browser-based enterprise application, wherein the user interface event is publishable across all open browser tabs at runtime of the browser-based enterprise application;

responsive to a publication instruction from the user through the user interface composition function, configuring, at design time of the browser-based enterprise application in the enterprise computing environment, a first application page of the browser-based enterprise application, wherein the first application page of the browser-based enterprise application thus configured is operable to generate the user interface event at runtime of the browser-based enterprise application in response to a trigger and to publish the user interface event thus generated to a browser local storage; and responsive to a subscription instruction from the user through the user interface composition function, configuring, at design time of the browser-based enterprise application in the enterprise computing environment, a second application page of the browser-based enterprise application, wherein the second application page of the browser-based enterprise application thus configured at design time of the browser-based enterprise application is operable to periodically poll the browser local storage for the user interface event at runtime of the browser-based enterprise application and, in response to the user interface event published by the first application page to the browser local storage at runtime of the browser-based enterprise application, process the user interface event and update the second application page at runtime of the browser-based enterprise application.

9. The computer program product of claim 8, wherein the instructions are further translatable by the processor to perform:
configuring the first application page of the browser-based enterprise application to publish the user interface event to the browser local storage by creating a data structure containing event data for the user interface event and storing the data structure in the browser local storage.

10. The computer program product of claim 9, wherein the data structure includes an event name and a payload for the user interface event.

11. The computer program product of claim 9, wherein the instructions are further translatable by the processor to perform:

configuring the plurality of application pages to, in response to the user interface event published by the first application page to the browser local storage at runtime of the browser-based enterprise application, each append a tab identifier to a data structure for the user interface event in the browser local storage.

12. The computer program product of claim 11, wherein the instructions are further translatable by the processor to perform:

configuring the plurality of application pages to each check a master list in the browser local storage, determine whether the each application page is last to process the user interface event, and, responsive to a determination of being last to process the user interface event, remove the user interface event from the browser local storage.

13. The computer program product of claim 8, wherein the instructions are further translatable by the processor to perform:

responsive to subscription instructions from the user to configure a plurality of application pages of the browser-based enterprise application to subscribe to the user interface event, configuring the plurality of application pages to each periodically poll the browser local storage for the user interface event at runtime of the browser-based enterprise application and, in response to the user interface event published by the first application page to the browser local storage at runtime of the browser-based enterprise application, to each process the user interface event and update the each application page.

14. A system, comprising:
a processor;
a non-transitory computer-readable medium; and
stored instructions translatable by the processor to perform:
   providing an application designer tool for composing browser-based enterprise applications in an enterprise computing environment, the application designer tool having a plurality of components including a user interface composition function;
   responsive to a cross-tab communication instruction received through the user interface composition function from a user in the enterprise computing environment, configuring, at design time, a user interface event for a browser-based enterprise application, wherein the user interface event is publishable across all open browser tabs at runtime of the browser-based enterprise application;
   responsive to a publication instruction from the user through the user interface composition function, configuring, at design time, a first application page of the browser-based enterprise application, wherein the first application page of the browser-based enterprise application thus configured is operable to generate the user interface event at runtime of the browser-based enterprise application in response to a trigger and to publish the user interface event thus generated to a browser local storage; and
   responsive to a subscription instruction from the user through the user interface composition function, configuring, at design time, a second application page of the browser-based enterprise application, wherein the second application page of the browser-based enterprise application thus configured at design time is operable to periodically poll the browser local storage for the user interface event at runtime of the browser-based enterprise application and, in response to the user interface event published by the first application page to the browser local storage at runtime of the browser-based enterprise application, process the user interface event and update the second application page at runtime of the browser-based enterprise application.

15. The system of claim 14, wherein the stored instructions are further translatable by the processor to perform:
configuring the first application page of the browser-based enterprise application to publish the user interface event to the browser local storage by creating a data structure containing event data for the user interface event and storing the data structure in the browser local storage.

16. The system of claim 15, wherein the data structure includes an event name and a payload for the user interface event.

17. The system of claim 14, wherein the stored instructions are further translatable by the processor to perform:
responsive to subscription instructions from the user to configure a plurality of application pages of the browser-based enterprise application to subscribe to the user interface event, configuring the plurality of application pages to each periodically poll the browser local storage for the user interface event at runtime of the browser-based enterprise application and, in response to the user interface event published by the first application page to the browser local storage at runtime of the browser-based enterprise application, to each process the user interface event and update the each application page.

18. The system of claim 17, wherein the stored instructions are further translatable by the processor to perform:
configuring the plurality of application pages to, in response to the user interface event published by the first application page to the browser local storage at runtime of the browser-based enterprise application, each append a tab identifier to a data structure for the user interface event in the browser local storage.

19. The system of claim 17, wherein the stored instructions are further translatable by the processor to perform:
configuring the plurality of application pages to each check a master list in the browser local storage, determine whether the each application page is last to process the user interface event, and, responsive to a determination of being last to process the user interface event, remove the user interface event from the browser local storage.

20. The system of claim 14, wherein the user interface composition function of the application designer tool includes a cross-tab communication mechanism and wherein the cross-tab communication instruction is received from the user by the user selecting the cross-tab communication mechanism in configuring the user interface event for the browser-based enterprise application at design time.

* * * * *